Jan. 2, 1934.    D. B. HOWELL    1,941,802
APPARATUS FOR MANUFACTURING EARTHENWARE
Filed April 30, 1932    4 Sheets-Sheet 2
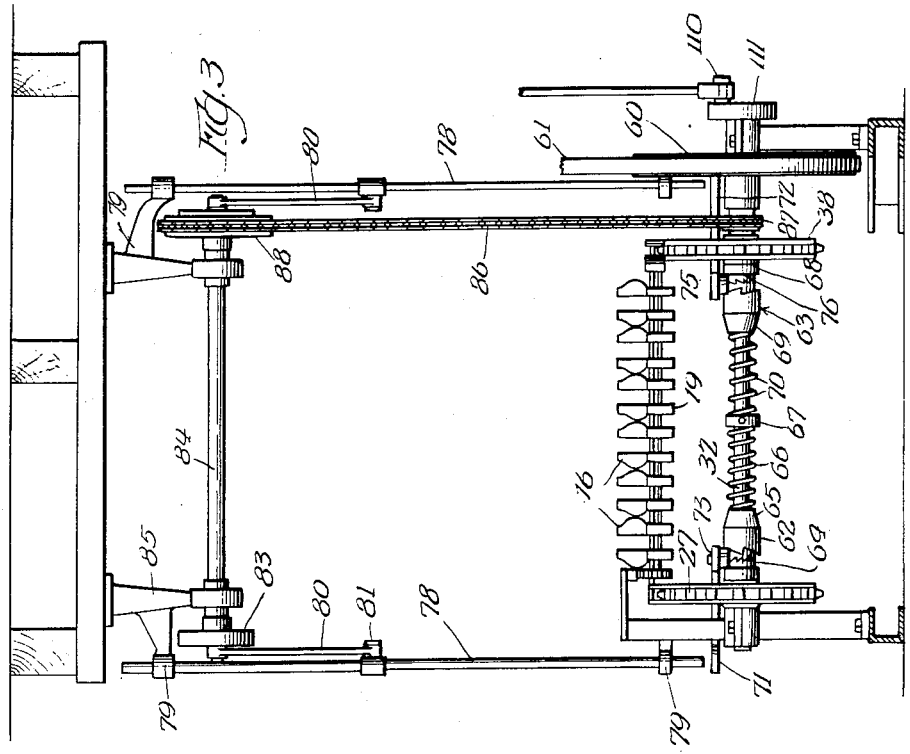
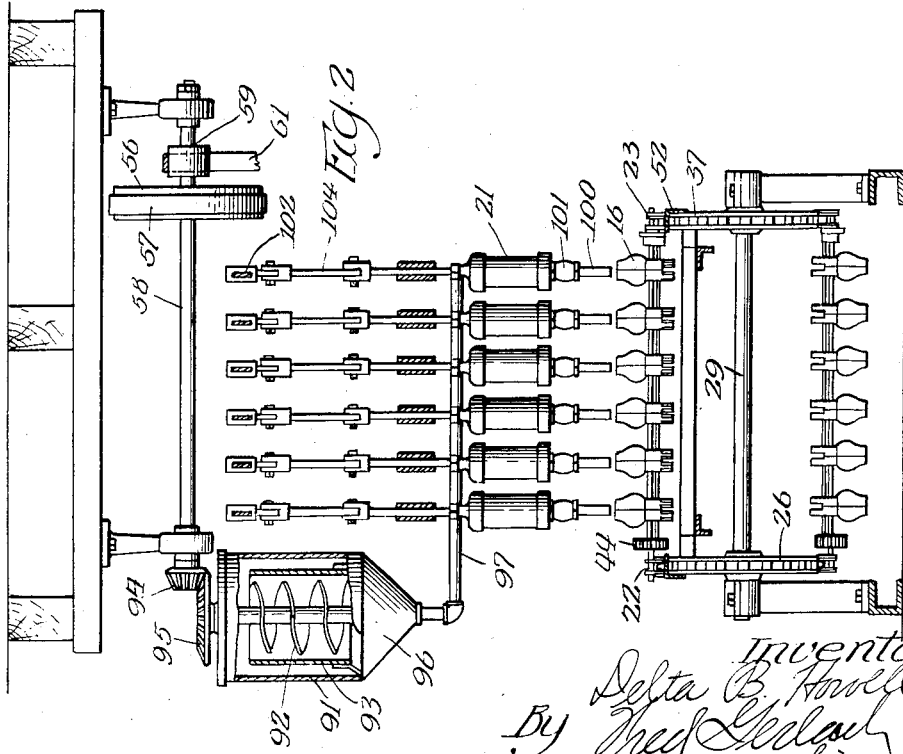

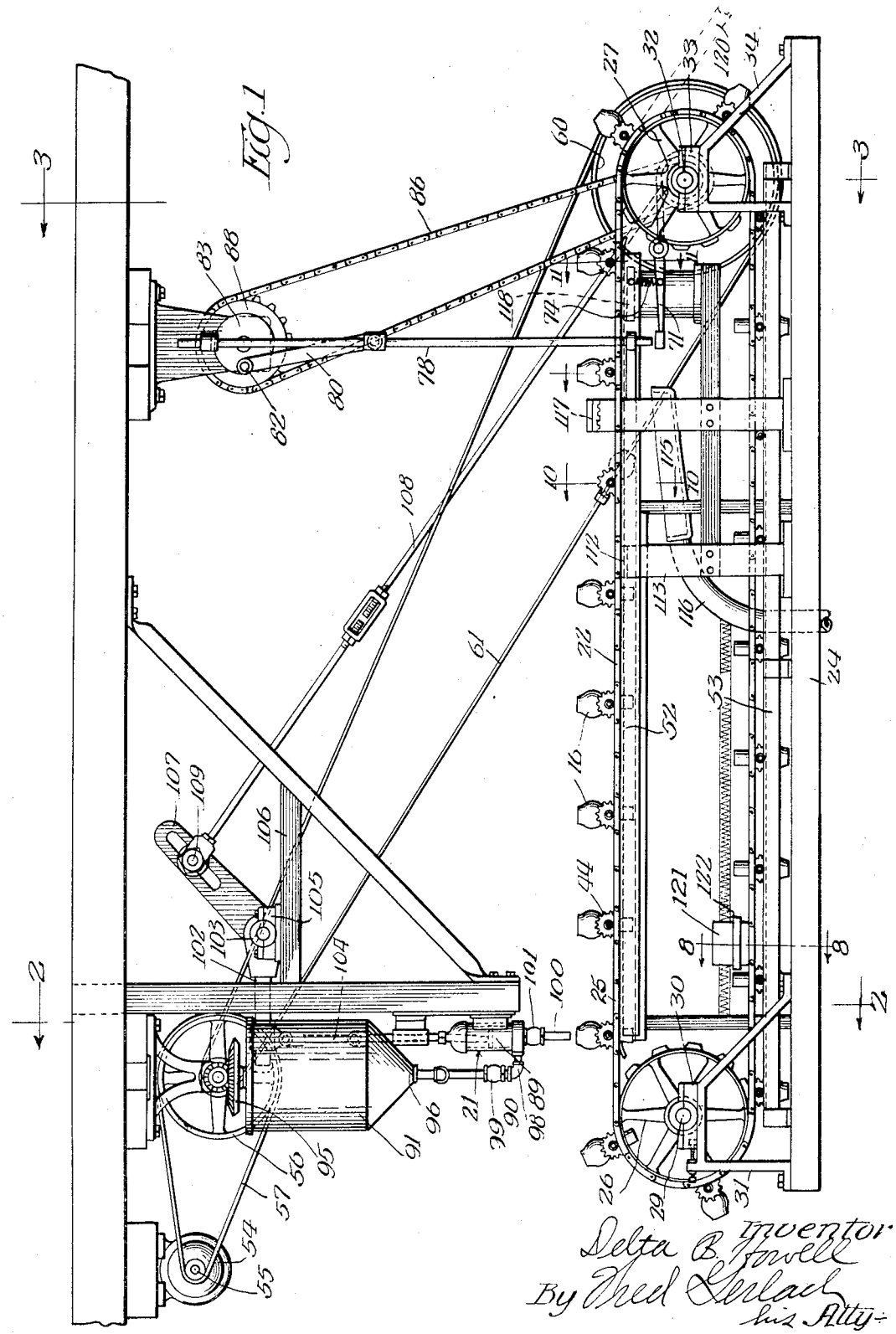

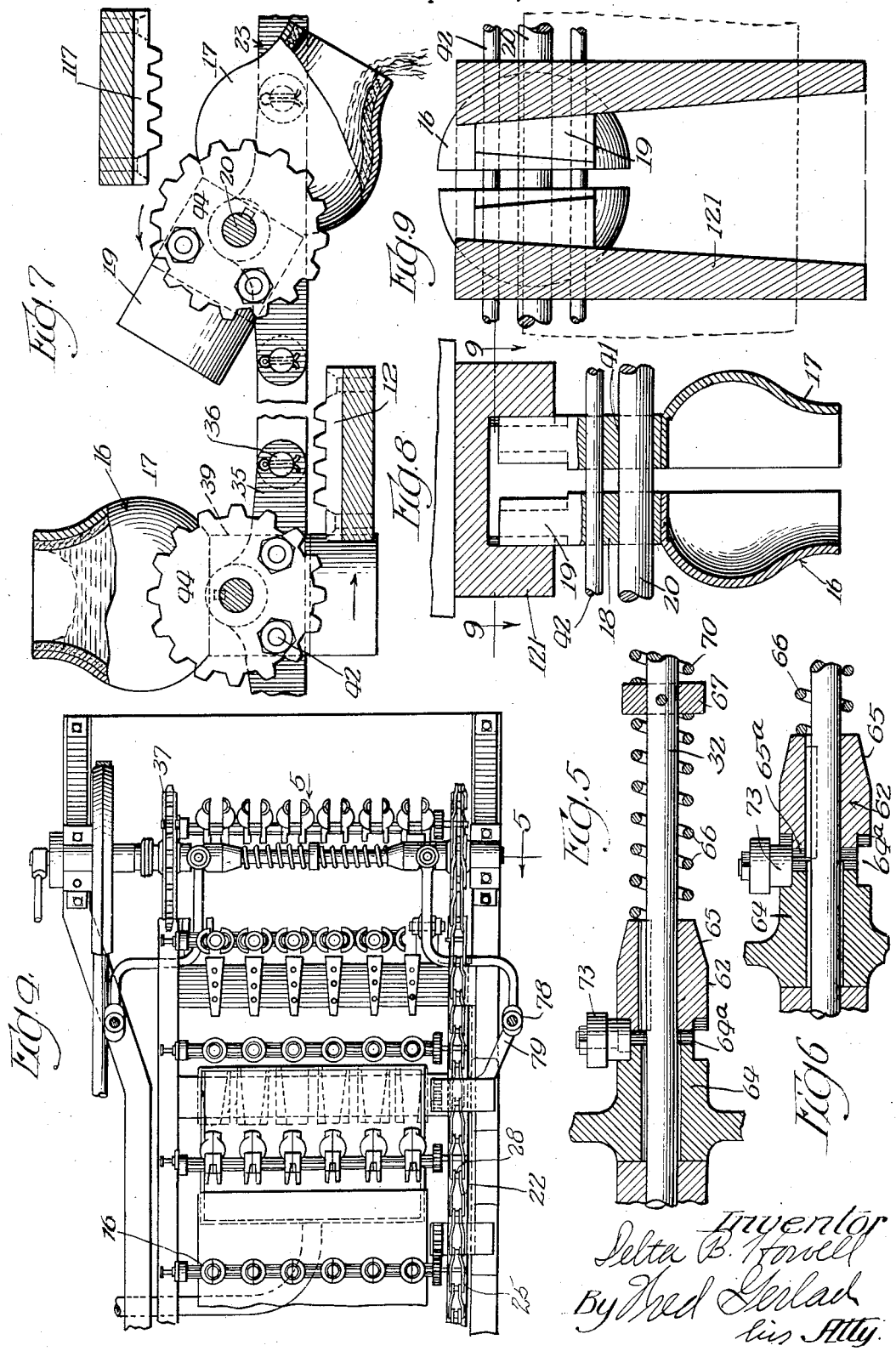

Jan. 2, 1934.  D. B. HOWELL  1,941,802
APPARATUS FOR MANUFACTURING EARTHENWARE
Filed April 30, 1932  4 Sheets-Sheet 4
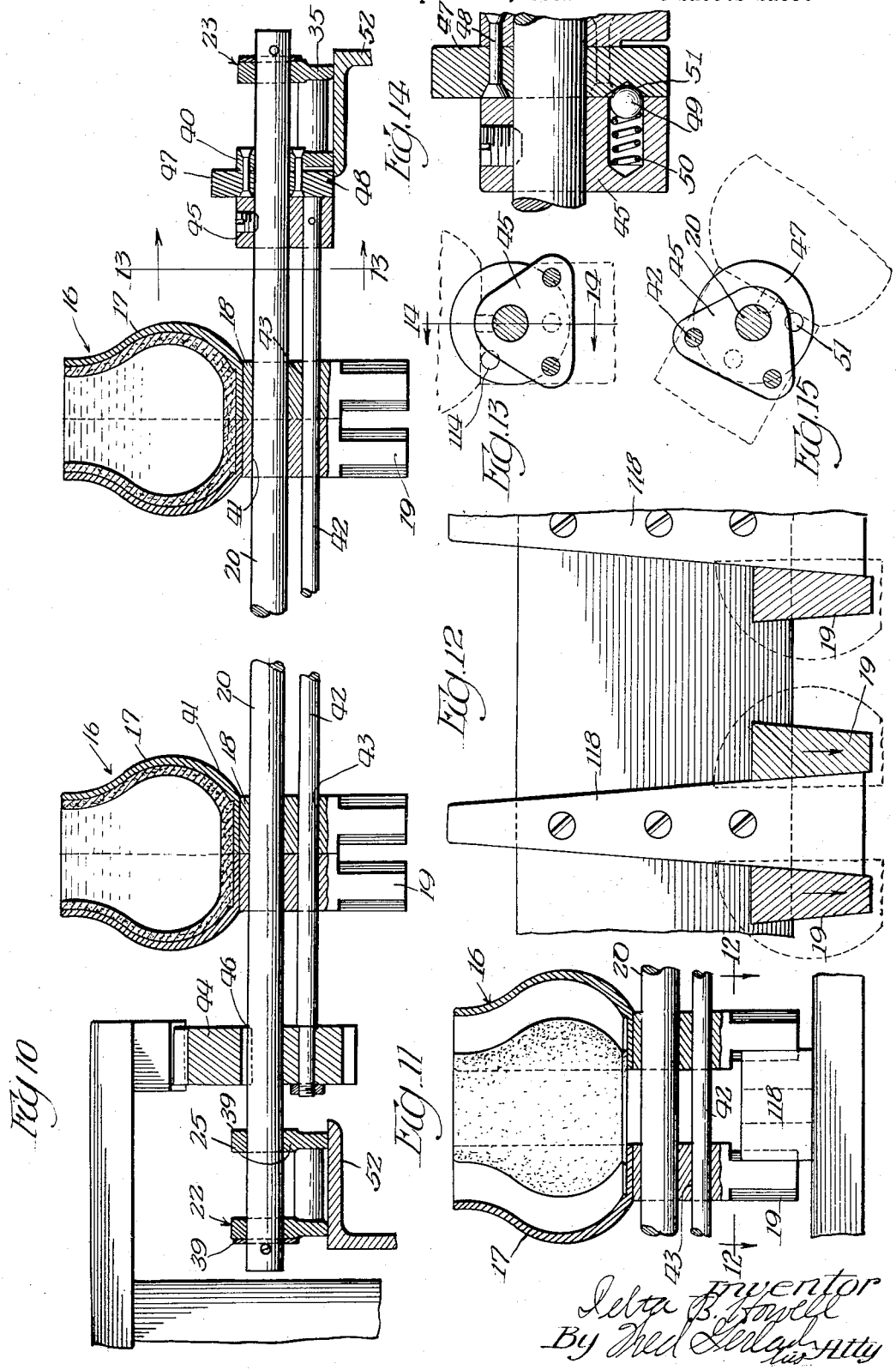

Patented Jan. 2, 1934

1,941,802

UNITED STATES PATENT OFFICE 1,941,802

APPARATUS FOR MANUFACTURING EARTHENWARE

Delta B. Howell, Murphysboro, Ill.

Application April 30, 1932. Serial No. 608,369

12 Claims. (Cl. 25—29)

The present invention relates generally to apparatus for use in connection with the manufacture of earthenware. More particularly, the invention relates to that type of apparatus which is designed to cast the earthenware into the desired shape before it is subjected to the firing operation, and comprises a plurality of molds which are formed of plaster of Paris or like moisture-absorbing material and are adapted to be filled with a mixture of clay and water, and then tilted or inverted so as to pour out the excess material and leave coatings or linings which form the earthenware and are relieved of moisture by the absorptive effect of the plaster of Paris molds and by evaporation by heat and air circulation.

One object of the invention is to provide an apparatus of this type which reduces the cost and expedites the casting of the earthenware, by virtue of the fact that it is completely automatic and comprehends the filling and tilting of the molds and the discharge of the coatings or linings without manual manipulation.

Another object of the invention is to provide an apparatus of the character under consideration in which the molds are mounted on shafts which extend between and are carried by a pair of laterally spaced chains, and provision is made for intermittently driving the chains and for filling the molds during the periods at which the chains are at rest.

Another object of the invention is to provide an apparatus of the aforementioned type in which the shafts for supporting the molds are rotatable and embody pinions which, during drive of the chains, coact with racks so as first to tilt the molds for material-pouring purposes and then to right the molds, that is, shift them back into their normal position with respect to the chains.

A further object of the invention is to provide an apparatus for casting earthenware in which the molds are of sectional construction and are mounted on the shafts so that the sections thereof are movable to and from one another, and provision is made for separating the mold-sections after tilting of the molds in order to effect discharge of the coatings or linings from the mold.

A still further object of the invention is to provide an earthenware casting apparatus which is generally of new and improved construction, operates efficiently and may be built at a comparatively low and reasonable cost.

Other objects of the invention and the various advantages and characteristics of the present construction will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side view of an apparatus embodying the invention;

Figure 2 is a vertical transverse section on the line 2—2 of Figure 1, showing in detail the arrangement and construction of the pumps which are used to fill the molds during the periods at which the chains are at rest;

Figure 3 is a vertical transverse section on the line 3—3 of Figure 1, illustrating the mechanism for driving the chains intermittently and showing the manner in which the mold-sections are adapted to be separated in order to effect discharge of the coatings or linings from the mold;

Figure 4 is a plan view of the end of the apparatus wherein the shafts are rotated for mold-tilting purposes and the mold-sections are separated for coating or lining-discharging purposes;

Figures 5 and 6 are sectional views of the mechanism which is employed for the purpose of driving the chains intermittently;

Figure 7 is a side view, illustrating the manner in which the pinions on the shaft between the two chains coact with the racks so as to tilt and then right the molds;

Figure 8 is an enlarged vertical section on the line 8—8 of Figure 1, illustrating in detail the mechanism for shifting the mold-sections together after they have been separated in order to permit of discharge of the coatings or linings from the mold;

Figure 9 is a horizontal section on the line 9—9 of Figure 8;

Figure 10 is an enlarged vertical section on the line 10—10 of Figure 1, exhibiting in detail the construction and arrangement of the molds;

Figure 11 is an enlarged vertical section on the line 11—11 of Figure 1, showing the manner in which the mold-sections are separated for coating or lining-discharging purposes;

Figure 12 is a horizontal section on the line 12—12 of Figure 11; and

Figures 13, 14 and 15 are detailed views of the parts which are used to hold the molds in their normal and tilted positions.

The apparatus which forms the subject matter of the invention is adapted to be used in connection with the casting of earthenware and comprises a plurality of molds 16. The latter are formed of plaster of Paris or like moisture-absorbing material, and are adapted, as hereinafter described, to be filled with a mixture of clay and water and then tilted or inverted in order to discharge the excess material and leave within the molds, coatings or linings which constitute the earthenware and are adapted to be placed into final form by glazing and firing or baking operations. By virtue of the fact that the molds are formed of plaster of Paris or similar material, the water or moisture is absorbed from the linings or coatings with the result that the latter are sufficiently stiff or rigid to undergo the glazing and baking operations without collapse or injury. The molds 16 are formed of any desired shape. They are of split or two-piece design and comprise complemental sections 17. These sections are mounted on blocks 18 which are formed of metal or any other suitable substance, and embody integral, depending, wedge-shaped lugs 19.

The molds are carried by a plurality of horizontally extending shafts 20 and are adapted, as hereinafter described, to be moved periodically and in succession past a group of pumps 21 for filling or charging purposes. The shafts 20 extend between and are carried by a pair of endless chains 22 and 23. These chains are positioned in side-by-side relation and are associated with a frame structure 24. The chain 22 consists of U-shaped links 25 and is supported by and extends around a vertically extending idler sprocket 26 and a vertically extending drive sprocket 27. The links 25 are connected together by pivot pins 28 which extend through the end parts of the links and form driving members whereby motion is transmitted to the chain 22 from the drive sprocket 27. The idler sprocket 26 is positioned at one end of the frame structure 24 and is secured fixedly to a horizontally extending shaft 29 which is journalled in a pair of bearings 30. The latter are supported by a pair of brackets 31 on the frame structure 24. The drive sprocket 27 is located at the other end of the frame structure 24 and is loosely mounted on a horizontally extending shaft 32. The latter is journalled in a pair of bearings 33 which are mounted on a pair of brackets 34 on the frame structure 24. The chain 23 consists of links 35 and pivot pins 36 and is supported by a vertically extending idler sprocket 37 and a vertically extending drive sprocket 38. The idler sprocket 37 is fixedly secured to the shaft 29 which carries the idler sprocket 26 for the chain 22. The drive sprocket 38 is loosely mounted on the shaft 32 which carries the drive sprocket 27 and is journalled in the bearings 33. The idler sprockets 26 and 37 are positioned at the same elevation as the drive sprockets 27 and 38 and hence the chains 22 and 23 which carry the shafts 20 extend horizontally and embody upper and lower reaches. The ends of the shafts 20 which are associated with and supported by the chain 22 are journalled in pairs of laterally spaced lugs 39. These pairs of lugs are formed as parts of certain of the links 25, as shown more particularly in Figures 1 and 10 of the drawings. The ends of the shafts 20 which are associated with and carried by the chain 23 are journalled in pairs of lugs 40. These pairs of lugs are formed as parts of certain of the links 35 and are aligned with the pairs of lugs 39. The blocks on which are mounted the mold-sections 17 have horizontally extending holes 41 above the depending wedge-shaped lugs 19. The shafts 20 extend through these holes and support the mold-sections so that they are shiftable to and from one another and lengthwise of the shafts. In order to prevent rotation of the molds around the shafts 20, pairs of rods 42 are provided. These pairs of rods are associated with the shafts 20 and extend through holes 43 in the blocks 18. The ends of each pair of rods 42 which are opposite to the chain 22 extend through and are secured to a pinion 44 on the shaft with which the pair is associated. The ends of each pair of rods which are opposite to the chain 23 extend through and are secured to a member 45 which is mounted on and fixed to the shaft 20 with which the pair is associated. The pinions 44 are positioned inwardly of the chain 22 and are fixed to the shafts 20 by keys 46. The members 45 are positioned inwardly of the chain 23 and fit against members 47 which are secured by rivets 48 to the links on the chain 23 which embody the pairs of lugs 40. The rivets 48 extend through the members 47, as shown in Figures 10 and 14, and are carried by the innermost lugs 40.

By virtue of the fact that the ends of the shafts 20 are journalled in the lugs 39 and 40, the molds are free so that they may be rotated into an inverted position for discharge purposes. In order normally to hold the shafts 20 against rotation relatively to the chains 22 and 23, the members 45 are provided with spring-pressed balls 49. The latter are disposed within sockets 50 in the members 45 and are urged into recesses 51 in the inner faces of the members 47. The spring pressure which is applied to the balls 49 serves to retain the balls within the recesses 51 and thus the shafts 20 are normally maintained against rotation relatively to the chains 22 and 23. The upper reaches of the chains are supported by angle-iron bars 52 which are carried by the frame structure 24. The lower reaches of the chains 22 and 23 are supported by means of angle-iron bars 53. These bars are supported in any suitable manner beneath the bars 52.

The chains 22 and 23 are driven intermittently in order to advance the molds 16 step-by-step past the pumps 21 for charging or filling purposes. The mechanism for intermittently driving the chains comprises an electric motor 54 which is provided on the rotor shaft thereof with a pulley 55 and is suspended in any suitable manner from the ceiling of the room in which the apparatus is disposed; a pulley 56 which is driven from the pulley 55 by an endless belt 57 and is fixedly secured to a horizontally extending shaft 58; a pulley 59 which is mounted on the shaft 58 and is located adjacent the pulley 56; a pulley 60 which is driven from the pulley 59 by an endless belt 61 and is keyed or otherwise fixedly secured to one end of the shaft 32; a clutch 62 between the shaft 32 and the drive sprocket 27; and a clutch 63 between the shaft 32 and the drive sprocket 38. The clutches 62 and 63 operate to effect a driving connection between the drive sprockets and the shaft 32 which is constantly driven during operation of the electric motor 54. The clutch 62 comprises a clutch-member 64 and a complemental clutch-member 65. The member 64 is formed integrally with the hub of the drive sprocket 27 and embodies lugs or teeth 64a. The complemental clutch-member 65 is connected by way of splines or keys to the shaft 32 so that it is driven by the shaft and is slidable longitudinally thereof. It embodies clutch lugs or teeth 65ᵃ which are adapted to mesh or interfit with the lugs or teeth 64ᵃ of the member 64 and effect a direct driving connection betwen the shaft 32 and the drive sprocket 27. A coil spring 66 extends around the shaft 32 and serves to force the complemental clutch-member 65 into its operative position. This spring extends between and abuts against the clutch-member 65 and a collar 67 on the central portion of the shaft 32. The clutch 63 is similar in construction and design to the clutch 62 and comprises a clutch-member 68 and a complemental clutch-member 69. The clutch-member 68 is formed integrally with the hub of the drive sprocket 38 for the chain 23. The complemental clutch-member 69 is connected by way of splines for sliding movement on the shaft 32 and embodies teeth which are adapted to mesh with teeth or lugs on the clutch-member 68. A coil spring 70 extends between the collar 67 and the complemental clutch-member 69 and urges the latter into its operative position in order to effect a driving connection between the shaft 32 and the drive sprocket 38. The two clutches are controlled by means of a pair of centrally fulcrumed levers 71 and 72. The lever 71 is provided at one end thereof with a roller 73 which is adapted to ride between coacting cam surfaces on the clutch-members 64 and 65 and to hold the clutch-member 65 in its disengaged or inoperative position. A spring 74 is applied to the lever 71 in such a manner that the lever is held in a position wherein the roller 73 operates to lock out the complemental clutch-member 65 from the member 64. The lever 72 is similar in function and arrangement to the lever 71 and embodies at one end thereof a roller 75. The latter is adapted, when the lever is shifted in one direction, to ride between coacting cam surfaces 76 on the clutch-members 68 and 69 so as to hold the member 69 in disengaged position with respect to the member 68. A coil spring not shown is applied to the lever 72 so that the latter is normally urged into a position wherein the roller 75 rides between the cam surfaces and locks out or holds the complemental clutch-member 69 from the clutch-member 68. The levers 71 and 72 are periodically actuated by means of a pair of vertically extending rods 78 so as to withdraw the rollers 73 and 75 from the coacting cam surfaces and thus effect engagement of the clutches and drive of the chains. These rods are slidable vertically in bearings 79 and are reciprocated for lever-actuating purposes by means of a pair of vertically extending pitmen 80. The lower ends of the pitmen are connected to pins 81 on the central portions of the rod 78. The upper end of the pitmen are connected to crank pins 82 on a pair of disks 83 at the ends of a horizontally extending shaft 84. The shaft 84 is supported in a pair of bearings 85 and is driven from the shaft 32 by means of a chain 86. The latter extends around a sprocket 87 on the shaft 32 and a sprocket 88 on one end of the shaft 84. During drive of the shaft 84, the pitmen 80 operate to reciprocate the rod 78. Reciprocation of the rod serves to actuate the levers 71 so that the clutches are intermittently engaged for chain-driving purposes. On the down stroke of the rod, the levers are actuated so that the rollers 73 and 75 are withdrawn from the cam surfaces. Such withdrawal of the rollers operates, as hereinbefore described, to permit of engagement of the clutches and results in drive of the chains 22 and 23 from the shaft 32. During the up stroke of the rod 78, the springs urge the levers 71 and 72 into a position wherein the rollers 73 and 75 ride between the cam surfaces of the clutch-members and hold the clutch-members in their inoperative position. In such position of the complemental clutch-members, there is no drive of the chains from the shaft 32 and the molds are stationary. The motor 54 and the clutches 62 and 63, together with the intermediate driving means and the rods 78 exemplify simple means for driving the chains 22 and 23 intermittently for step-by-step feed or movement of the molds 16.

The pumps 21 are located above the idler sprockets 26 and 37 and operate to fill the molds when the latter are shifted thereunder. They comprise casings 89 and pistons 90 and are associated with a reservoir 91 wherein the material for filling the molds is retained. The reservoir 91 is suspended or otherwise supported from the ceiling of the room in which the apparatus is disposed and is provided with a worm elevator 92 for breaking up air cells in the clay. This elevator operates within a cylindrical shell 93 and is driven from the shaft 58 by means of a bevelled pinion 94 and a bevelled gear 95. The pinion is fixedly secured to one end of the shaft 58 and operates, during drive of the motor, to drive the gear 95. The latter is fixed to the upper end of the shaft which carries the worm elevator 92. The lower end of the reservoir 91 is shaped to form a conical discharge member 96. The casings 89 of the pumps 21 are connected to receive the material from the discharge member 96 by way of a horizontal feed pipe 97 and branch feed pipes 98. The latter embody check valves 99 connected to the lower ends of the pump casings. The pistons 90 are slidably mounted within the casings 89 and are adapted, during the upstroke thereof, to suck the material into the casing. During the down stroke of the piston, the material is forced downwardly into the subjacent molds through discharge pipes 100. The latter extend vertically and embody check valves 101 for closing the discharge pipes 100 during the up stroke of the piston. The pistons are reciprocated by means of a plurality of arms 102 which project radially from a horizontally extending shaft 103 and are connected to the pistons by means of links 104. The shaft 103 is mounted in bearings 105 on a support 106 and is adapted to be rocked by means of an arm 107 so as to oscillate the arms 102 for pump-operating purposes. The links 104 extend between the distal ends of the arms 102 and the upper ends of the stems for the pistons of the pumps. The arm 107 is oscillated so as to rock the shaft 103 by means of a connecting rod 108. The latter is connected by a pin and slot connection 109 to the distal end of the arm 107 and is operated by means of a crank pin 110 on a disk 111 which is fixed to and driven by the shaft 32. During drive of the shaft 32, the connecting rod 108 is actuated so as to oscillate the arm 107. Oscillation of the arm 107, as previously pointed out, rocks the shaft 103 and effects operation of the pumps through the medium of the arms 102 and the links 104. By utilizing the pin and slot connection 109, the stroke of the pump pistons may be regulated. Timing of the pumps is such that the pump pistons are forced downwardly to effect discharge of the material when the molds on one of the shafts 20 are at rest beneath the discharge pipes 100.

The drive of the chains 22 and 23 is such that the molds in the upper reaches travel from the idler sprockets 26 and 37 towards the drive sprockets 27 and 38. As a result of this arrangement, the molds, after filling thereof, travel towards the drive sprockets. In order to tilt the molds so as to pour out or discharge the excess material and leave but coatings or linings within the molds, a rack 112 is provided. This rack is located substantially midway between the idler sprockets and the drive sprockets and is supported on a standard or bracket 113 so that it engages the pinions 44 as the chains are driven and the shafts 20 are moved. When the pinions 44 engage the rack 112, the shafts 20 are caused to rotate so as to invert the molds, and thus effect discharge of the excess material. In order to hold the molds momentarily in their inverted position so as to permit of the complete discharge of the excess material, the members 47 are provided with recesses 114. These recesses are adapted to receive the balls 49 after they have been forced out of the recesses 51 and cooperate with the balls so as to hold the shafts 20 in fixed relation with respect to the chains. When the shafts 20 are rotated as the result of the pinions engaging the rack 112, the balls 49 are forced out of the recesses 51 and ride against the inner faces of the members 47 until they snap into the recesses 114. In the recesses 114, the balls serve to hold the shafts in a position wherein the molds are held at the desired inverted position. The excess material which is poured out of the molds is caught by means of a pan 115. This pan is supported by the frame structure beneath the upper reaches of the endless chains 22 and 23, and is provided with a discharge pipe 116. The molds are righted, after being tilted for material-discharging purposes, by means of an inverted rack 117. The latter is positioned over the upper reaches of the chains, as shown in Figures 1 and 7 of the drawings, and operates, when engaged by the pinions 44 and during drive of the chains, to rotate the shafts 20 back into their normal position.

The coatings or linings remaining in the molds are relieved of the moisture therein by the absorptive properties of the plaster of Paris molds and are released from the molds by shifting the mold-sections apart prior to passage of the molds around the drive sprockets 27, 38. The means for separating the mold-sections consists of a group of wedges 118 (see Figure 12). These wedges are mounted upon a bracket 119 between the inverted rack 117 and the drive sprockets and coact with the depending wedge-shaped lugs 19 on the blocks 18 to separate the mold-sections as the molds are moved towards the drive sprockets. During movement of the molds towards the drive sprockets, the wedge-shaped lugs 19 are engaged by the wedges 118 and are forced lengthwise of the shafts 20 into positions wherein the mold-sections are sufficiently separated to permit of discharge of the coatings or linings. When the molds pass around the drive sprockets from the upper reaches of the chains to the lower reaches, the coatings or linings which are comparatively stiff and rigid fall from the molds onto a discharge chute 120. The mold-sections are shifted together after discharge of the coatings or linings from the molds, by means of a group of wedges 121. These wedges are located adjacent the idler sprockets 26 and 37 and directly over the lower reaches of the chains. They are so positioned and arranged that, during drive of the chains, they engage the wedge shaped lugs 19 and force together the blocks 18 in order to shift together or close the mold-sections.

In order to dry the molds, the moisture is absorbed from the material by an electric heater 122. This heater is located beneath the lower reaches of the chains and operates to dry the molds as they move from the wedges 121 towards the idler sprockets 26 and 37.

Assuming that the electric motor 53 is in operation, the operation of the apparatus is as follows:

The chains 22 and 23 are intermittently driven from the shaft 32 through the medium of the clutches 62 and 63. As the molds are brought to rest beneath the discharge pipes 100, the material from which the earthenware is made is forced by the pumps 21 into the mold cavities. After being filled, the molds travel step-by-step towards the drive sprockets 27 and 38. When the pinions 44 come into contact with the rack 112, the shafts 20 are rotated so as to tilt the molds and pour out the excess material. When the pinions 44 engage the rack 117, the shafts 20 are rotated in the opposite direction so as to right the molds. After the molds are righted, the mold-sections are separated by operation of the wedges 118. The latter, as previously pointed out, coact with the depending wedge-shaped lugs 19, during drive of the chains, and effect shift of the blocks 18 on the shafts 20. When the molds in separated form pass around the drive sprockets 27 and 38, the coatings or linings are discharged onto the chute 120. After discharge of the coatings or linings from the molds, the mold-sections are shifted together by the wedges 121 adjacent the lower reaches of the chains 22 and 23. Prior to passage of the molds around the idler sprockets, the moisture is taken out of the mold-sections by the action of the electric heater 122.

The herein described apparatus is exceedingly efficient in operation and permits of casting of the earthenware at a low price by virtue of the fact that it is automatic and the earthenware is cast without manual manipulation.

The invention is not to be understood as restricted to the details set forth, since these may be modified within the scope of the appended claims, without departing from the spirit and scope of the invention. It is also to be understood that the word "earthenware" is used in its broadest sense and contemplates articles of porcelain, chinaware, bone china, dinnerware, tableware, translucent ware, semi-porcelain ware, beleek ware, perian ware, vases, toys and all mechanically casted clay products.

Having thus described the invention, what I claim as new and desire to secure by Letters Patent, is:

1. In an apparatus for casting earthenware, the combination of a supporting structure, conveyor-means supported on said structure, a plurality of molds mounted on the conveyor-means so that they may be tilted, motor driven means for driving the conveyor-means, pump-means connected to be driven by the motor and operative to charge the molds successively with predetermined quantities of earthenware-forming material, means for tilting the molds after charging thereof and during drive of the conveyor-means so as to pour out the excess material and leave linings within the molds, and means permitting discharge of the linings from the molds.

2. In an apparatus for casting earthenware, the combination of a supporting structure, endless conveyor-means supported on said structure, a plurality of molds mounted on the conveyor-means so that they may be tilted, motor-driven means for driving the conveyor-means intermittently so as to move the molds step-by-step, pump-means connected to be driven by the motor and operative to charge the molds successively with earthenware-forming material during the periods when the molds are at rest, means for tilting the molds after charging thereof and during drive of the conveyor-means so as to pour out the excess material and leave linings within the molds, and means permitting discharge of the linings from the molds.

3. In an apparatus for casting earthenware, the combination of a supporting structure, conveyor-means supported on said structure, a mold adapted to be filled with earthenware-forming material and mounted on the conveyor-means so that it may be tilted, said mold comprising a pair of separable sections, means for driving the conveyor-means so as to move the mold, means for tilting the mold after charge thereof and during drive of the conveyor-means so as to pour out the excess material and leave a lining within the mold, and means for separating the mold-sections so as to permit of discharge of the lining from the mold.

4. In an apparatus for casting earthenware, the combination of a supporting structure, endless conveyor-means supported on said structure, a plurality of molds mounted on the conveyor-means so that they may be tilted and comprising separable sections, means for charging the molds with earthenware-forming material, means for driving the conveyor-means so as to move the molds successively past the charging means for charging purposes, means for tilting the molds after charging thereof and during drive of the conveyor-means so as to pour out the excess material and leave linings within the molds, and means for separating the mold-sections after tilting of the molds in order to permit of discharge of the linings from said molds.

5. In an apparatus for casting earthenware, the combination of a supporting structure, endless conveyor-means supported on said structure, a plurality of molds mounted on the conveyor-means so that they may be tilted and comprising separable sections, means for charging the molds with earthenware-forming material, means for driving the conveyor-means so as to move the molds successively past the charging means for charging purposes, means for tilting the molds after charge thereof and during drive of the conveyor-means so as to pour out the excess material and leave linings within the molds, means for separating the mold-sections after tilting of the molds in order to permit of discharge of the linings from said molds, and means for returning the mold-sections to their normal position.

6. In an apparatus for casting earthenware, the combination of a supporting structure, endless conveyor-means supported on said structure, a plurality of molds mounted on the conveyor-means so that they may be tilted and comprising separable sections, means for charging the molds with earthenware-forming material, means for driving the conveyor-means so as to move the molds successively past the charging means for charging purposes, means for tilting the molds after charge thereof and during drive of the conveyor-means so as to pour out the excess material and leave linings within the molds, means for separating the mold-sections after tilting of the molds in order to permit of discharge of the linings from said molds, and means operative in response to drive of the conveyor means to return the mold-sections to their normal position.

7. In an apparatus for casting earthenware, the combination of a supporting structure, an endless conveyor supported on said structure and comprising a pair of laterally spaced sprocket-supported chains and cross shafts carried by and extending between the chains, a plurality of molds mounted on the cross shafts so that they may be tilted, means for charging the molds with earthenware-forming material, means for driving the conveyor so as to move the molds successively past the charging means for charging purposes, means for tilting the molds after charging thereof and during drive of the conveyor so as to pour out the excess material and leave linings within the molds, and means permitting discharge of the linings from the molds.

8. In an apparatus for casting earthenware, the combination of a supporting structure, an endless conveyor supported on said structure and comprising a pair of laterally spaced sprocket-supported chains and cross shafts carried by and extending between the chains, a plurality of molds mounted on the cross shafts so that they may be tilted and comprising separable sections movable lengthwise of said cross shafts, means for charging the molds with earthenware-forming material, means for driving the conveyor so as to move the molds successively past the charging means for charging purposes, means for tilting the molds after charging thereof so as to pour out the excess material and leave linings within the molds, and means for separating the mold-sections after tilting of the molds in order to permit of discharge of the linings from said molds.

9. In an apparatus for casting earthenware, the combination of a supporting structure, an endless conveyor supported on said structure and comprising a pair of laterally spaced sprocket-supported chains and cross shafts carried by and extending between the chains, a plurality of molds mounted on the cross shafts so that they may be tilted and comprising separable sections movable lengthwise of said cross shafts, means for charging the molds with earthenware-forming material, means for driving the conveyor so as to move the molds successively past the charging means for charging purposes, means for tilting the molds after discharge thereof and during drive of the conveyor so as to pour out the excess material and leave linings within the molds, means operative after tilting of the molds and in response to drive of the conveyor to separate the mold-sections in order to permit of discharge of the linings, and means for returning the mold-sections to their normal position.

10. In an apparatus for casting earthenware, the combination of a supporting structure, an endless conveyor supported on said structure and comprising a pair of laterally spaced sprocket-supported chains and cross shafts carried by and extending between the chains, a plurality of molds mounted on the shafts so that they may be tilted and comprising separable sections movable lengthwise of said cross shafts, means for driving the conveyor intermittently so as to move the molds step-by-step, pump-means operative to charge the molds successively with earthenware-forming material during the periods when the molds are at rest, means for tilting the molds after charging thereof and during drive of the conveyor so as to pour out the excess material and leave linings within the molds, means operative in response to drive of the conveyor and after tilting of the molds for separating the mold-sections in order to permit of discharge of the linings, and means for returning the mold-sections to their normal positions after discharge of the linings.

11. In an apparatus for casting earthenware, the combination of a supporting structure, a horizontally extending endless conveyor supported on said structure and comprising a sprocket-supported chain having an upper reach and a lower reach, a plurality of molds mounted on the conveyor so that they may be tilted and comprising separable sections, means above the conveyor for charging the molds with earthenware-forming material, means for driving the conveyor so as to move the molds successively past the charging means for charging purposes, means associated with the upper reach of the conveyor chain for tilting the molds after charging thereof so as to pour out the excess material and leave linings within the molds, means associated with the upper reach of the conveyor chain for tilting the molds after charging thereof so as to pour out the excess material and leave linings within the molds, means also associated with the upper reach of the conveyor chain for separating the mold-sections in order to permit of discharge of the linings when the molds pass from the upper reach of the conveyor chain to the lower reach, and means associated with the upper reach of the conveyor chain for returning the mold-sections to their normal positions.

12. In an apparatus for casting earthenware, the combination of a supporting structure, a horizontally extending endless conveyor supported on said structure and comprising a pair of laterally spaced sprocket-supported chains and cross shafts carried by and extending between the chains, a plurality of molds mounted on the cross shafts so that they may be tilted and comprising separable sections movable lengthwise of the cross shafts, means above the conveyor for charging the molds with earthenware-forming material, means for driving the conveyor so as to move the molds successively past the charging means for charging purposes, and means associated with the upper reach of the conveyor for tilting the molds after charging thereof and during drive of the conveyor so as to pour out the excess material and leave linings within the molds, means also associated with the upper reach of the conveyor for separating the mold-sections in order to permit of discharge of the linings from the molds when the molds pass from the upper reach of the conveyor to the lower reach, and means associated with the upper reach of the conveyor for returning the mold-sections to their normal position.

DELTA B. HOWELL.